United States Patent Office 2,793,183
Patented May 21, 1957

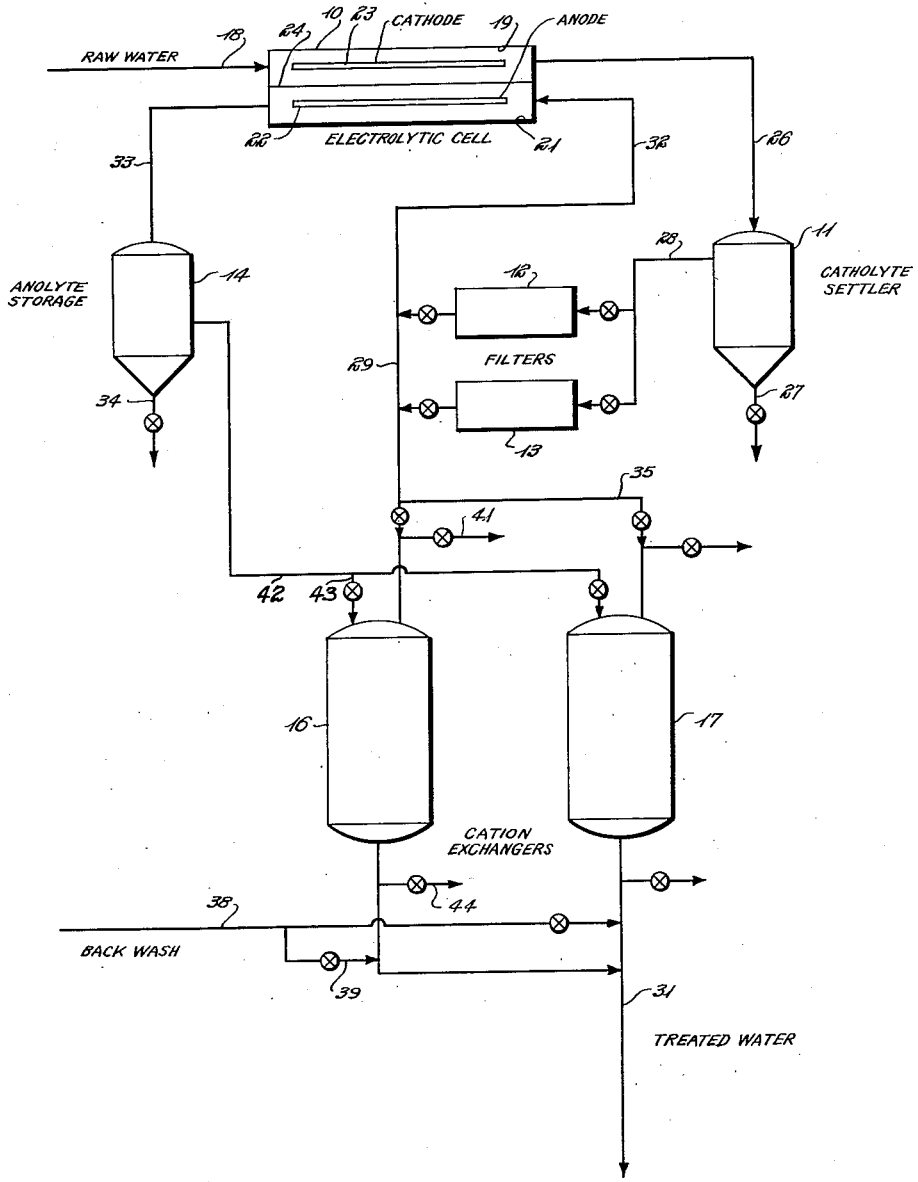

2,793,183

ELECTROLYTIC AND ION EXCHANGE TREATMENT OF WATER

Benjamin H. Thurman, New York, N. Y., assignor to Clayton Manufacturing Company, El Monte, Calif., a corporation of California Application July 15, 1954, Serial No. 443,490

11 Claims. (Cl. 204—151)

This invention relates to water treatment, and more particularly, to a process for reducing the soluble electrolyte content of natural or waste waters.

Electrolytic treatments of water to remove electrolytes therefrom, involving the employment of a three-compartment diaphragm type of electrolytic cell have been proposed. By passing the water to be treated through the central compartment of such a cell electrolytes can be substantially removed from water. Such processes are, however, extremely slow and inefficient and are so expensive to operate that they have not been widely employed commercially. It has also been proposed to soften water by treatment in the cathode compartment of a two-compartment diaphragm type of electrolytic cell. A portion of the electrolyte content of the water is thereby removed and the resulting softened water is suitable for certain uses. Such a process is efficient and inexpensive to operate but the softened water is highly alkaline in that it contains a considerable amount of sodium hydroxide. Proposed electrical or chemical treatments to neutralize the softened water have not materially reduced the total electrolyte content thereof.

Natural or waste waters have also been treated to partially or substantially completely remove electrolytes from solution therein by ion exchange treatments. The first ion exchange treatments involved only a cation exchange step operating upon the sodium cycle and resulted in the removal of hardness producing materials without substantial decrease in total electrolyte content, polyvalent metal cations merely being exchanged for alkali metal cations. Later improved processes including both an anion exchange step and a cation exchange step operating on the hydrogen cycle have produced treated waters substantially free of electrolytes. Such processes when operated on a large scale, however, involve the employment of large-size expensive apparatus and the employment of large amounts of regenerating reagents, which must be purchased and supplied to the process. Two separate regenerating solutions must be supplied, one an acidic solution such as a solution of hydrochloric or sulfuric acid and the other an alkaline solution such as a solution of sodium carbonate or sodium hydroxide.

The operation costs of conventional ion exchange processes is comprised of three items which are, in order of magnitude; the cost of regenerating chemicals, the cost of replacement of ion exchange material which is lost due to attrition, and the cost of back-wash water. These three cost items have thus far been so substantial that, when coupled with a high initial installation cost, they have practically prohibited the use of conventional ion exchange processes on a commercial scale in the treatment or purification of water.

The regenerating chemicals used in conventional ion exchange processes have normally consisted of acids and alkalies at concentrations ranging from 2 to 10 or 12%. Prior investigations have always shown that concentrations below about 2% were of such a low regenerating efficiency as to be impractical. See Industrial and Engineering Chemistry, September 1941, pages 1203–1212, volume 33, No. 9. The optimum concentrations of the cation and anion exchange resin regenerating solutions were believed to be 4% and 2% respectively. The regenerating chemicals are almost universally obtained by purchasing normal commercial grade acids and alkalies at the very high concentrations at which they are normally marketed and these are then adjusted to the desired concentration by dilution with the available supply of water.

According to the present invention there is provided a water treating process in which an electrolytic cell is employed in conjunction with an ion exchange step so that both the electrolytic cell and the ion exchanger operate at their highest efficiency and in such a manner that the electrolytic cell produces an effluent which is usable to regenerate the ion exchange material. That is to say, the anolyte discharged from the electrolytic cell is highly acidic in nature and may be employed as a regenerant for the cation exchanger. The treatment of the incoming water in the cathode compartment of the electrolytic cell removes a substantial portion of both the cation and anions originally present such that no anion exchange step is ordinarily required, and the necessary capacity of the cation exchange step is materially reduced. Substantially all of the calcium and magnesium cations usually present are precipitated in the form of insoluble compounds by the treatment of the water in the cathode compartment of the cell. The same is true of any small amounts of iron, manganese or other polyvalent cations which may be present and substantially the only cation which requires removal in the cation exchange step is the sodium cation or any small amounts of other alkali metal cations which may be present. Also a substantial portion of the anions such as chloride or sulfate anions present in the raw water are removed either by migration into the anolyte or as part of the precipitated insoluble compounds referred to above. Such anions will be referred to here as acid-forming anions. Thus the employment of an electrolytic treatment of the raw water in conjunction with a cation exchange step eliminates the anion exchange step, reduces the required size of the cation exchange equipment and at the same time produces a regenerating solution for the cation exchange material, thereby eliminating a supply of regenerating agent from an external source.

When water is demineralized according to the invention water treatment cost is reduced in three distinct items; these being, the cost of the regenerating chemicals, the cost of rinse water, and the cost of replacement ion exchange material to make up attrition losses. The cost of regenerating chemicals is completely eliminated, the cost of make-up ion exchange material is drastically reduced, while the cost of rinse water is considerably reduced.

It is therefore an object of the present invention to provide an improved water treatment process which may be employed to substantially reduce the soluble electrolyte content of raw water.

Another object of the invention is to provide an improved process of treating water involving both an electrolytic treatment and a cation exchange treatment.

Another object of the invention is to provide an improved process of treating water in which an electrolytic treatment of the water is employed to remove a substantial portion of the dissolved electrolyte from the water being treated and an ion exchange treatment is utilized to further reduce its dissolved electrolyte content wherein the electrolytic step also produces an effluent suitable for regenerating the material used in the ion exchange step.

Another object of the invention is to provide an improved process of treating water in which an electrolytic treatment of the water is employed to remove a substantial portion of the dissolving electrolyte from the water being treated and to produce a regenerating solution for cation exchange material employed later in the process.

Other objects and advantages of the invention will appear in the following description of the process and apparatus suitable for carrying out the process is shown in the attached drawing which is a schematic diagram of such apparatus.

Referring to the drawing, apparatus suitable for carrying out the present process may include an electrolytic cell 10, a catholyte settler 11, catholyte filters 12 and 13, an anolyte storage tank 14 and a pair of cation exchangers 16 and 17. Raw water may be delivered into the process through a conduit indicated at 18 and be passed through the cathode compartment 19 of the electrolytic cell 10. The electrolytic cell 10 may be of the two-compartment diaphragm type also having an anode compartment 21. An insoluble anode 22, such as an anode made of carbon or graphite, may be positioned in the anode compartment 21 and any suitable cathode 23, which the catholyte will not attack, such as an iron cathode, may be positioned in the cathode compartment 10. The anode and cathode compartments may be separated from each other by a porous or permeable diaphragm indicated at 24, which diaphragm may be of any known or suitable type, such as one made of canvas.

A suitable aqueous anolyte is passed through the anode compartment 21 in contact with the anode 22 as will be described later and the raw water may be passed through the cathode compartment 19 in contact with the cathode 23. When the anode and cathode are connected across a suitable source of direct current power (not shown) electrolytic action in the electrolytic cell causes the catholyte to become highly alkaline. A substantial portion of such acid-forming anions as chloride and sulfate anions migrate into the anode compartment leaving such cations as sodium, calcium and magnesium cations in the cathode compartment. Cations of this type which may be present in the anolyte also migrate into the cathode compartment under cathodic influence and in conjunction with those already present in the cathode compartment produce the high alkalinity referred to. Most of any bicarbonate anions present in the raw water are converted to carbonate anions by such high alkalinity and the resulting carbonate anions react with any calcium cations present before such anions migrate into the anode compartment. The high alkalinity causes insoluble alkaline compounds of such metals as calcium and magnesium to be precipitated, the calcium being precipitated as calcium carbonate and the magnesium being precipitated as magnesium hydroxide. Other metals such as iron and manganese, if present, are also precipitated as insoluble hydroxides and the resulting catholyte including any precipitate is delivered into the catholyte settler 11 through the conduit 26.

Most of the insoluble alkaline compounds formed by the cathodic treatment of the raw water above described will settle out in the catholyte settler and in many cases, substantially all of them will settle out. The settled material may from time to time be removed as a sludge through the conduit 27. If any appreciable amount of precipitate remains suspended in the partially treated water after settling in the settler 11, filters 12 and 13 may be employed alternately to remove such suspended material. That is to say, the settled water may be delivered to the filters 12 and 13 through the conduit 28. Ordinarily, the amount of suspended material will be very small such that filters of small capacity may be employed. Such filters may be of any suitable type, for example, sand filters or similar filters containing ground coal or they may be continuous filters having rotary filter drums, etc.

The partially treated water from the filters 12 and 13 may be delivered through a conduit 29 to one of the cation exchangers 16 or 17. The greater portion of the ions remaining in the partially treated water are alkali metal cations and their associated hydroxyl anions although a portion of the other anions originally present such as chloride or sulfate anions are still present. The alkali metal cations are easily removed by suitable cation exchange material positioned in the cation exchangers 16 and 17. The cation exchangers 16 and 17 may be of any known or suitable type. Usual types are closed chambers containing a bed of granular or bead type cation exchange material resting on a supporting bed of sand, gravel or ground coal in turn resting on a foraminous plate and are provided with suitable liquid distributors in the upper and lower portions thereof. Such cation exchangers are well known to the art and need not be further described. It will be appreciated that the cation exchangers 16 and 17 will be used alternately, one being employed for treating water while the other is being regenerated. The final treated water may be discharged from the process through a conduit 31.

A portion of the partially treated water discharged from the filters 12 and 13 may be employed as an anolyte supply and such water may be delivered into the anode compartment 21 of the electrolytic cell through a conduit 32. In its passage through the electrolytic cell the anolyte becomes highly acidic due to the migration into the anolyte of such acid-forming anions as chloride and sulfate anions and the migration from the anolyte of alkali metal cations. The anolyte discharged from the cell through the conduit 33 is essentially an acid solution, for example, a hydrochloric or sulfuric acid solution or a solution of both acids, depending upon the nature of the raw water introduced into the process and generally has a concentration of less than about one percent. This acidic anolyte may be stored in the storage tank 14 and employed as a regenerant for the cation exchange material in the cation exchangers 16 and 17. Any small amount of sludge which may collect in the anolyte storage tank may be withdrawn through the conduit 34.

The apparatus may include conduits for enabling the regenerating of the cation exchange material in the cation exchangers 16 and 17, and for enabling the back washing and rinsing of this material. Thus the cathodic treated and filtered water supplied through the conduit 29 to the cation exchanger 16 may be passed through such exchanger until the cation exchange material therein is exhausted. The supply of this water may then be transferred to the cation exchanger 17 and delivered thereto through a conduit 35. The cation exchanger 16 may then be back washed by supplying back-wash water through the conduits 38 and 39, the back-wash water after passing through the cation exchanger 16 being discharged to waste through the pipe 41. The back-wash water may, for example, be raw water as its primary function is to mechanically remove any foreign material which may collect in the cation exchanger 16. Regenerating solution may then be supplied to the cation exchanger 16 from the anolyte storage tank 14 through the conduits 42 and 43 to regenerate the cation exchange material in the cation exchanger 16, spent regenerating solution being discharged to waste through the conduit 44. A portion of the settled and filtered cathodic treated water supplied through the conduit 29 may then be employed as rinsing water to remove the residual regenerant from the cation exchanger 16, the rinsing water also being discharged to waste through the conduit 44. The cation exchanger 16 is then in condition for further treatment of water supplied through the conduit 29 when the cation exchange material in the exchanger 17 is exhausted. It will be understood that during operation of the cation exchanger 16 the cation exchanger 17 may be back-washed, regenerated and rinsed in a similar manner.

The raw water entering the process may contain various combinations of a large number of ions. The usual cations of the electrolyte contained in such water are calcium, magnesium and sodium cations although the water may contain other polyvalent cations such as iron or manganese and may contain other alkali metal cations such as potassium. The usual anions of the electrolyte present in such water are bicarbonate, sulfate and chloride anions although small amounts of other anions may be present. Upon introduction of such water into the cathode compartment 19 of the electrolytic cell, a substantial portion of such anions as the chloride and sulfate anions migrate through the diaphragm into the anode compartment 21. The catholyte rapidly becomes alkaline due to the presence of magnesium, calcium, and sodium cations particularly the latter. Bicarbonate anions are largely converted to carbonate anions before they migrate into the anode compartment of the cell. The carbonate anions combine with the calcium cations to produce insoluble calcium carbonate at a pH of about 10 to 10.5 and substantially all of the calcium and carbonate ions are precipitated from the process as insoluble calcium carbonate. At a pH of 11 to 11.5 the magnesium cations are precipitated as insoluble magnesium hydroxide and any iron or manganese or similar cations are similarly precipitated. If the raw water is extremely low in sodium or other alkali metal cations the catholyte may not become sufficiently alkaline to precipitate magnesium hydroxide in which case it may be necessary to add a very small amount of an alkali metal compound such as sodium carbonate or sodium hydroxide to the raw water. Most raw waters do, however, contain enough sodium cations to produce a pH of at least 11.5 in the cathode compartment of the cell. Alkali metal cations such as sodium cations are not precipitated as they do not form insoluble compounds. The resulting catholyte which is predominantly a solution of sodium or other alkali metal hydroxides along with the precipitated insoluble compounds referred to above is then delivered into the catholyte settler 11 in which the insoluble compounds settle out and are discharged from the process as sludge. In many cases, the settling operation will produce an effluent which is substantially free of insoluble compounds in suspension, but in many cases, a small amount of such insoluble compounds does not settle and the filters 12 and 13 may be employed to remove such insoluble compounds. It will be understood that one of the filters 12 and 13 may be employed while the other is being cleaned.

Although the raw water may be employed as the anolyte supply the partially treated water delivered from the settler 11 or filters 12 and 13 is particularly suitable as anolyte supply. It is desirable to prevent the pH of the anolyte during its passage through the anode compartment 21 of the cell from becoming too low. That is to say, a pH of the discharged anolyte substantially below 2 will tend to prevent the pH of the catholyte in the cell from becoming high enough to precipitate substantially all of the polyvalent metal cations in the water passing through the cathode compartment. By supplying alkaline water from the settler 11 to the anode compartment, the anolyte passing through such compartment can be delivered therefrom at a pH of approximately 2 and of suitable concentration for use as a regenerant. Generally speaking the concentration of the anolyte regenerant is below about one percent and in most cases is no higher than 0.5 percent. Concentrations as low as 0.1 percent have been found satisfactory. The more alkaline the anolyte supply the longer the anolyte can remain in the anode compartment. If greater dilution is required, raw water can be employed as the anolyte supply or any desired mixture of raw water and settled anolyte. Any cations introduced into the anode compartment either from the raw water or from the settled catholyte will largely migrate into the cathode compartment through the diaphragm 23 so as to be present in the catholyte discharged from the cathode compartment either in solution or as part of precipitated insoluble compounds.

With most raw waters, the anolyte discharged from the anode compartment is therefore essentially an aqueous solution of a mixture of hydrochloric acid and sulfuric acid although either may be absent or substantially absent depending upon the nature of the raw water. The discharged anolyte is suitable for regeneration of the cation exchange material in the cation exchangers 16 and 17.

As stated above, the cation exchange material may be of any suitable type capable of being operated upon the hydrogen cycle. Thus the cation exchange material may be such materials as sulfonated coal derivatives or sulfonated synthetic resins. The sulfonated synthetic resins may be either phenol sulfonic acid derivatives or nuclear sulfonated aromatic hydrocarbon polymers. Certain of the carboxylic acid type of synthetic resin exchangers may also be employed. The various types of cation exchange materials are well known to the art and need not be further described. Commercial examples of satisfactory resins are the Amberlite resins IR–112 and IR–120 and described by the manufacturer as cation exchange resins of the nuclear sulfonic type. Any of these materials will remove alkali metal cations as well as any small amounts of residual polyvalent metal cations from the water supplied thereto in the present process and replace such cations with hydrogen cations. A water, substantially free from the cations discussed above is therefore discharged from the process.

While it has been generally believed that the aforementioned resins to be practical had to be regenerated by solutions ranging in concentration from about 2 to about 12 percent, it has now been found that they may be efficiently regenerated in the disclosed process with regenerating solutions of much lower concentrations. While I do not desire to be in any way restricted to an explanation of this phenomena it is believed that the reason for this lies in the particular composition of the regenerating solutions produced according to the process of the invention. Thus in the process of the invention the regenerating solution is depleted of those ions which decrease it regenerating effectiveness and it is consequently superior to a regenerating solution obtained by diluting commercial acid with available water.

The water discharged from the settler 11 or filters 12 and 13 is substantially free of dissolved oxygen and of dissolved or suspended silicon-containing compounds. The exact mechanism by which silicon-containing compounds are removed is not completely understood but it is probable that complex silicon-containing compounds are also precipitated in the cathode compartment of the electrolytic cell. In any event, special ion exchange steps for removing silicon-containing compounds are ordinarily not required even if a low silicon content water is required from a raw water containing a considerable amount of silicon compounds. Also the conversion of bicarbonate ions to carbonate ions in the cathode compartment of the cell makes it unnecessary for this conversion to be accomplished in the cation exchanger.

In the above description of the invention, it has been assumed that a sufficient amount of the acid-forming anions such as chloride and sulfate ions migrate into the anode compartment and are thereby eliminated from the water supplied to the cation exchangers 16 or 17 to produce a water sufficiently low in said anions for the intended purpose. The electrolytic cell can be operated in that manner to substantially reduce the content of such anions in the water discharged from the cathode compartment and that is the preferred operation. However, the cell can be operated at higher rates of flow or at smaller current densities such that a lesser amount of such anions are removed from the catholyte. These anions will not be removed in the cation exchangers and will be present in the water discharged therefrom. Thus, the removal of anions may be carried to a desired degree in the present process depending upon the extent of treatment given the raw water in the cathode compartment of the cell. Alternatively, if it is found more economical on a particular water to remove a lesser amount of such anions in the cathode compartment of the cell but it is desirable to remove substantially all of the acid-forming anions from the water discharged from the process, an anion exchange step may also be employed in the present process, preferably after the cation exchange step. In such cases the required capacity of the anion exchange step may be made very much less than is the case when no electrolytic treatment is employed since a substantial percentage of the anions may be easily and rapidly removed from the raw water by the cathodic treatment. The anion exchange step may be carried out in exchangers similar to the exchangers 16 and 17 employing known or suitable anion exchange material. Suitable anion exchange materials are known to the art and may be for example, organic amine derivatives of synthetic resins in which the amines employed may be polyethylene polyamines, guanidines or metaphenyl diamine, synthetic resin derivatives of polyethylene polyamine or derivative containing quarternary nitrogen groups usually being the most effective. Commercial examples of satisfactory anion exchange resins are Amberlite IRA-400 and IRA-410 and said by the manufacturer to be strongly basic amine-type anion exchange resins covered by United States Patent 2,591,573. In any event the electrolytic cell economically and quickly removes a substantial portion of the undesired ions from the raw water and at the same time supplies the regenerating solution for the cation exchange step. Anion exchangers are, in general, much less efficient and slower in operation than cation exchangers and the present invention eliminates or very much reduces the capacity of the anion exchange step.

If the water desired for a particular purpose need not have all of the anions such as chloride or sulfate ions removed an operation such as above described, in which the treatment in the cathode compartment of the electrolytic cell is followed by a cation exchange treatment may be employed. If all of the alkali metal cations need not be removed, it is apparent that a portion of the water from the settler 11 or the filters 12 and 13 may be by-passed around the cation exchangers and it is, of course, apparent that any desired portion of raw water may be by-passed around the entire process and blended with the treated water to produce a water of desired electrolyte content.

An important advantage of the present process is that the water wasted for washing, rinsing, etc., is materially reduced over prior processes effecting a similar reduction in electrolyte content. In general, a single instead of two or more ion exchange steps, with their accompanying back-washing, regenerating and rinsing operations, is employed and the anolyte from the cell, which is usually discharged to waste, is employed as the regenerating solution instead of making up a separate regenerating solution.

*Example 1*

A raw hard water containing magnesium, calcium, and sodium cations and bicarbonate, sulfate, and chloride anions is passed through the cathode compartment of an electrolytic cell having an anode compartment separated from the cathode compartment by a permeable diaphragm. An insoluble carbon anode is positioned in the anode compartment, and an iron cathode is positioned in the cathode compartment. An alkaline water containing sodium ions is passed into the anode compartment in contact with the anode therein. The anode and cathode are connected across a source of direct current power, and the rate of flow of the solutions through the cell and the current density of the cell are adjusted to provide electrolytic action resulting in an increase in alkalinity of the catholyte to a pH of about 11.5 and to cause the anolyte to reach a pH of approximately 2. Upon introduction of the raw water into the cathode compartment of the cell, a substantial portion of the chloride and sulfate anions migrate through the permeable diaphragm into the anode compartment, and sodium ions in the anolyte solution migrate into the cathode compartment. The catholyte rapidly becomes alkaline due to the presence of magnesium, calcium, and sodium cations, particularly the latter. Bicarbonate anions are largely converted to carbonate anions before they migrate into the anode compartment of the cell. The carbonate anions combine with the calcium cations in the cathode compartment to produce calcium carbonate and substantially all of the calcium and carbonate ions are precipitated as insoluble calcium carbonate. The magnesium cations are precipitated in the cathode compartment as insoluble magnesium hydroxide. The sodium cations are not precipitated, and form sodium hydroxide in the catholyte solution. The alkaline catholyte containing precipitated calcium carbonate and magnesium hydroxide is withdrawn and passed to a settling tank where the insoluble compounds are permitted to settle. Alkaline catholyte solution from which most of the precipitate has been settled, is withdrawn from the settling tank and filtered to remove substantially all of the remaining precipitate. A portion of the settled and filtered catholyte solution is introduced into the anode compartment of the electrolytic cell to provide the feed water for such compartment. By virtue of the alkalinity of this feed water, the pH of the anolyte during its passage through the anode compartment of the cell is prevented from becoming so low that the high alkalinity in the cathode compartment cannot be attained. The acid anolyte issuing from the anode compartment is collected for further use. The remaining settled and filtered catholyte solution which contains sodium hydroxide but has been depleted of calcium and magnesium ions as well as sulfate, chloride, and bicarbonate anions, is introduced into a cation exchange unit containing a synthetic resin of the nuclear sulfonic acid type in hydrogen form. In this unit the remaining cations, primarily sodium ions, are removed and are replaced with hydrogen ions which unite with the hydroxyl ions to form water. The treated water issuing from the cation exchanger is substantially completely demineralized.

After the cation exchange material has become substantially exhausted, the ion exchange unit is backwashed with raw water and is then regenerated by the accumulated acid anolyte solution from the electrolytic cell. This acid regenerating solution, while having a relatively low acid concentration, less than 1.0 percent, has been previously depleted of polyvalent metal cations which would otherwise decrease its regenerative effectiveness. After regeneration with the dilute acid has been completed, the cation exchange material is rinsed with a portion of the settled and filtered catholyte solution from the cathode compartment of the electrolytic cell, and is then in condition for demineralizing a further portion of such water.

*Example 2*

The process is carried out as in Example 1, except that the electrolytic cell is operated under conditions of flow and current density such that the chloride and sulfate anions are not completely removed from the catholyte effluent solution. After settling and filtering the catholyte solution, a portion of such solution is passed through a cation exchange resin unit operating on the hydrogen cycle as in the aforementioned example, and then through an anion exchange unit containing a strongly basic amine-type anion exchange resin in hydroxyl form, so that the remaining acid anions are replaced with hydroxyl ions to form water. After exhaustion of the exchange units, the cation exchange resin is regenerated with acid anolyte solution, and the anion exchange resin is regenerated with a portion of the settled and filtered alkaline catholyte solution.

While certain ranges, conditions, materials and embodiments of the invention have been disclosed it will be understood that this has been for purposes of clarity and illustration and is not to be deemed limiting in any sense, the invention being limited solely by the scope and spirit of the appended claims.

This application is a continuation of my copending application 184,309, filed September 11, 1950, and now abandoned.

What is claimed is:

1. The process of removing dissolved electrolytes from water, comprising the steps of: flowing said water through the treating compartment of a multicompartment direct current electrolytic cell to reduce the multivalent ion content of said water, flowing said water through cation exchange material to further reduce its dissolved electrolyte content, simultaneously flowing water through another compartment of said electrolytic cell where it is subjected to anodic influence to reduce its pH to approximately 2, and flowing said latter water through said cation exchange material to regenerate said material.

2. The process of removing dissolved electrolytes from water, comprising the steps of: flowing said water through a compartment of a multicompartment direct current electrolytic cell where it is subject to cathodic influence to reduce its dissolved electrolyte content, flowing said water through a cation exchange material to further reduce its dissolved electrolyte content, simultaneously flowing water through another compartment of said electrolytic cell where it is subjected to anodic influence to reduce its pH to approximately 2, and flowing said latter water through said cation exchange material to regenerate said material.

3. The process of removing dissolved electrolytes from water, comprising the steps of: flowing said water through a compartment of a multicompartment direct current electrolytic cell wherein it is maintained in an alkaline condition, flowing said alkaline water through cation exchange resin to lower its pH, simultaneously flowing water through a compartment of said electrolytic cell where it is subjected to anodic influences to reduce its pH to approximately 2, and flowing said latter water through said cation exchange material to regenerate said material.

4. The process of removing dissolved electrolytes from water comprising the steps of: flowing said water through a compartment of a multicompartment direct current electrolytic cell wherein it is maintained in an alkaline condition and wherein precipitation of dissolved electrolytes occurs, flowing said water through cation exchange material to further reduce its dissolved electrolyte content, simultaneously flowing water through a compartment of said electrolyte cell where it is subjected to anodic influence to reduce its pH to approximately 2, and flowing said latter water through said cation exchange material to regenerate said material.

5. The process of removing dissolved electrolytes from water, comprising the steps of; flowing said water through a compartment of a multicompartment direct current electrolytic cell where it is subject to cathodic influence to reduce its dissolved electrolyte content, flowing said water through cation exchange material to further reduce its dissolved electrolyte content, simultaneously flowing water through another compartment of said electrolytic cell where it is subjected to anodic influence to provide an acid water, and flowing said latter water through said cation exchange material to regenerate said material, the rate of flow of regenerating water through the cell being so controlled as to maintain the concentration of acid less than approximately one percent.

6. The process of removing dissolved electrolytes from water, comprising the steps of: flowing said water through a compartment of a multicompartment direct current electrolytic cell wherein it is maintained in an alkaline condition, flowing said alkaline water through cation exchange resin to lower its pH, simultaneously flowing water through a compartment of said electrolytic cell where it is subjected to anodic influence to provide an acid water, and flowing said latter water through said ion exchange material to regenerate said material, the rate of flow of regenerating water through said cell being so controlled as to maintain the concentration of acid less than approximately one percent.

7. The process of removing dissolved electrolytes from water, comprising the steps of: flowing said water through a compartment of a multicompartment direct current electrolytic cell wherein it is maintained in an alkaline condition and wherein precipitation of dissolved electrolytes occurs, flowing said water through cation exchange material to further reduce its dissolved electrolyte content, simultaneously flowing water through a compartment of said electrolytic cell where it is subjected to anodic influence to provide an acid water and flowing said latter water through said cation exchange material to regenerate said materials, the rate of flow of regenerating water through said cell being so controlled as to maintain the concentration of acid less than approximately one percent.

8. The process of removing dissolved electrolytes from water, comprising the steps of: flowing said water through the cathode compartment of a multi-compartment direct current electrolytic cell to increase the alkalinity and reduce the multivalent ion content of said water, flowing said alkaline water through cation exchange material operating on the hydrogen cycle to further reduce its dissolved electrolyte content, simultaneously flowing water through the anode compartment of said electrolytic cell to provide a dilute acid water having an acid concentration of less than approximately 1 percent, and flowing said latter water through said cation exchange material to regenerate said material.

9. The process of removing dissolved electrolytes from water, comprising the steps of: flowing raw water through the cathode compartment of a multi-compartment direct current electrolytic cell to increase the alkalinity of said water and precipitate hardness components, flowing said alkaline water through cation exchange material operating on the hydrogen cycle to further reduce its dissolved electrolyte content, simultaneously flowing water through the anode compartment of said electrolytic cell to reduce the pH of said water to approximately 2, and flowing said latter water through said cation exchange material to regenerate said material.

10. The process of removing dissolved electrolytes from water, comprising the steps of: flowing said water through the cathode compartment of a multi-compartment direct current electrolytic cell to increase the alkalinity of said water and precipitate compounds of dissolved polyvalent metal ions, separating the precipitate from said alkaline water, flowing a portion of said alkaline water through a cation exchange material operating on the hydrogen cycle to further reduce its dissolved electrolyte content, flowing a further portion of said alkaline water through the anode compartment of said electrolytic cell to reduce its pH and to provide an acid water having an acid concentration of less than approximately 1 percent, and flowing said latter water through said cation exchange material to regenerate said material.

11. The process of removing dissolved electrolytes from water, comprising the steps of: flowing said water through the cathode compartment of a two-compartment direct current electrolytic cell to increase the alkalinity of said water to about pH 11.5 and precipitate compounds of dissolved polyvalent metal ions, separating the precipitate from said alkaline water, flowing a portion of said alkaline water through cation exchange material operating on the hydrogen cycle to further reduce its dissolved electrolyte content, flowing a further portion of said alkaline water through the anode compartment of said electrolytic cell to reduce its pH of approximately 2, and flowing said latter water through said cation exchange material to regenerate said material.

References Cited in the file of this patent

UNITED STATES PATENTS

| | | |
|---|---|---|
| 2,057,232 | Endell | Oct. 13, 1936 |
| 2,368,574 | Shoemaker | Jan. 30, 1945 |
| 2,535,035 | Briggs | Dec. 26, 1950 |
| 2,688,572 | Warshaw | Sept. 7, 1954 |

OTHER REFERENCES

Myers et al.: "Ind. & Eng. Chem.," vol. 33, (1941), pp. 1203–1212.

Streicher et al.: "Ind. & Eng. Chem.," vol. 45, (1953), pp. 2394–2401.